United States Patent
Durant et al.

(10) Patent No.: US 10,738,139 B2
(45) Date of Patent: Aug. 11, 2020

(54) DECARBOXYLATION AND AMIDATION OF POLYITACONIC ACID POLYMERS

(71) Applicant: Itaconix Corporation, Stratham, NH (US)

(72) Inventors: Yvon Durant, Lee, NH (US); Bo Jiang, Newmarket, NH (US); Melanie Hughes, Chester (GB); Timothy Mills, Chester (GB)

(73) Assignee: Itaconix Corporation, Stratham, NH (US)

( * ) Notice: Subject to any disclaimer, the term of this patent is extended or adjusted under 35 U.S.C. 154(b) by 0 days.

(21) Appl. No.: 16/224,244

(22) Filed: Dec. 18, 2018

(65) Prior Publication Data

US 2020/0190235 A1  Jun. 18, 2020

(51) Int. Cl.
C08F 8/32 (2006.01)
C08F 22/02 (2006.01)
C08F 8/34 (2006.01)

(52) U.S. Cl.
CPC ............... *C08F 22/02* (2013.01); *C08F 8/32* (2013.01); *C08F 8/34* (2013.01)

(58) Field of Classification Search
CPC ............... C08F 8/34; C08F 22/02; C08F 8/32
See application file for complete search history.

(56) References Cited

U.S. PATENT DOCUMENTS

| | | | |
|---|---|---|---|
| 3,055,873 A | 9/1962 | Hull et al. | |
| 3,309,424 A | 3/1967 | Abe et al. | |
| 3,444,143 A | 5/1969 | Morris, Jr. | |
| 5,223,592 A | 6/1993 | Hughes et al. | |
| 5,280,078 A | 1/1994 | Gregor et al. | |
| 5,314,943 A | 5/1994 | Steinwand | |
| 5,336,744 A | 8/1994 | Swift et al. | |
| 5,627,259 A | 5/1997 | Thaler et al. | |
| 5,716,529 A | 2/1998 | Suzuki et al. | |
| 6,001,264 A | 12/1999 | Suzuki et al. | |
| 6,197,907 B1 | 3/2001 | Yoshida et al. | |
| 6,646,086 B2 | 11/2003 | Slone | |
| 6,696,518 B1 | 2/2004 | Dersch et al. | |
| 7,040,747 B2 | 5/2006 | Kubota et al. | |
| 7,910,676 B2 | 3/2011 | Durant et al. | |
| 8,410,232 B2 | 4/2013 | Durant | |
| 9,487,423 B1 | 11/2016 | Durant et al. | |
| 2008/0009563 A1 | 1/2008 | Leyrer et al. | |
| 2009/0286847 A1 | 11/2009 | Fang et al. | |
| 2011/0037013 A1 | 2/2011 | Ragunathan et al. | |
| 2013/0296458 A1 | 11/2013 | Krull et al. | |
| 2014/0259439 A1 | 9/2014 | Paddock et al. | |
| 2015/0017459 A1 | 1/2015 | Nabuurs et al. | |
| 2015/0183978 A1 | 7/2015 | Vince et al. | |
| 2017/0036934 A1 | 2/2017 | Durant et al. | |

FOREIGN PATENT DOCUMENTS

| | | |
|---|---|---|
| DE | 1569083 | 2/1970 |
| EP | 0090574 | 10/1983 |
| EP | 0103254 A2 | 3/1984 |
| EP | 0659771 | 6/1995 |
| JP | 2004307703 A | 11/2004 |
| WO | 2015100412 | 7/2015 |
| WO | 2015100412 A1 | 7/2015 |

OTHER PUBLICATIONS

International Search Report and Written Opinion dated Feb. 23, 2011 issued in PCT International Patent Application No. PCT/US10/60726, 13 pages.
Office Action dated May 18, 2012, issued in U.S. Appl. No. 12/970,137, 9 pages.
Hua et al., Synthesis and Characterization of a Pharmaceutical Polyacrylate Emulsion, Journal of Chemical Engineering of Chinese Universities, Oct. 2008, 16 pages, No. 5, vol. 22.
STN structure search results, dated May 15, 2012, 178 pages.
Office Action dated Feb. 24, 2016, issued in U.S. Appl. No. 14/855,974, 9 pages.
Office Action dated Feb. 28, 2018, issued in U.S. Appl. No. 15/285,130, 14 pages.
Kagaku et al., Electrolytic Behavior of Some Polymers of Monocarboxylic Acids, 1968, Kobunshi Kagaku, vol. 25, Issue 276, 9 pages.
Notice of Allowance dated Dec. 19, 2018, issued in U.S. Appl. No. 15/285,130, 11 pages.
Office Action dated Dec. 12, 2016, issued in Canadian Patent Application No. 2,784,024, 4 pages.
Extended Search Report dated Apr. 24, 2013, issued in European Patent Application No. 10838245.8, 3 pages.
Examination Report dated Nov. 14, 2017, issued in Indian Patent Application No. 6230/DELNP/2012, 5 pages.
Office Action dated Jul. 1, 2013, issued in Mexican Patent No. MX/a/2012/006800, 4 pages.
International Search Report and Written Opinion dated Oct. 14, 2016, issued in PCT International Patent Application No. PCT/US16/45241, 12 pages.
Bryce E. Tate, The Decarboxylation of Itaconic Acid Polymers, Chemical Research and Development Department, Chas. Pfizer & Co., Inc., Die Makromolekulare Chemie 109, Jun. 2, 1967, pp. 176-193.
Yasuyoshi Sakaguchi et al., Electrolyte Behaviors of Some Polymers of Monocarboxylic Acids, Department of Applied Chemistry, Konan University, Nov. 28, 1967, English abstract provided, 8 pages.
P. Shakkthivel et al., Newly Developed Itaconic Acid Copolymers for Gypsum and Calcium Carbonate Scale Control, Department of Industrial Chemistry, Alagappa University, Wiley InterScience, Jun. 2, 2006, 8 pages.

(Continued)

*Primary Examiner* — Mark S Kaucher
(74) *Attorney, Agent, or Firm* — Grossman Tucker Perreault & Pfleger PLLC

(57) ABSTRACT

The present invention is directed at the decarboxylation and amidation of polyitaconic acid polymers. The polymers formed have useful dispersion properties and are suitable for use in the prevention of scaling.

12 Claims, No Drawings

(56) References Cited

OTHER PUBLICATIONS

Extended search report dated Feb. 26, 2019, issued in European Patent Application No. 16833757.4, 13 pages.
Milos B. Milovanovic, et al.—Preparation and modification of itaconic anhydride-methyl methacrylate copolymers, Journal of Serfian Chemical Society, Aug. 2, 2007, 8 pages, vol. 72 (12).
Examination Report dated Feb. 26, 2020, issued in Indian Patent Application No. 201817007583, 6 pages.
International Search Report and Written Opinion dated Feb. 27, 2020, issued in PCT International Patent Application No. PCT/US19/65951, 10 pages.

DECARBOXYLATION AND AMIDATION OF POLYITACONIC ACID POLYMERS

FIELD

The present invention is directed at the decarboxylation and amidation of polyitaconic acid polymers. The polymers formed have useful dispersion properties and are suitable for use in the prevention of scaling.

BACKGROUND

The polymerization of vinyl type monomers that contain pendant carboxylic acid functionality has always presented some unique challenges. For example, U.S. Pat. No. 5,223,592 reports that the critical aspect is to provide complete neutralization of an itaconic acid type monomer prior to conducting the polymerization reaction, where complete neutralization is identified as having two moles of base neutralizer for each mole of itaconic acid. U.S. Pat. No. 5,336,744 reports that polymers of itaconic acid are formed at high conversion by an aqueous polymerization process of partially neutralized monomer solution, water, polyvalent metal ion, and initiator.

U.S. Pat. No. 3,444,143 reports on partially decarboxylated polymers and copolymers of itaconic acid where up to about 30 mole percent of carbon dioxide is evolved per molar equivalent of itaconic acid in the polymer.

U.S. Pat. No. 9,487,423 reports on the partial decarboxylation of polyitaconic acid polymers or copolymers. The partially decarboxylated resins are suitable for use in preparation of dispersions as well as in anti-scaling applications.

SUMMARY

A method of simultaneously decarboxylating and introducing amide functionality to a polymer comprising:

(a) supplying the following polymer wherein repeating unit c is optional:

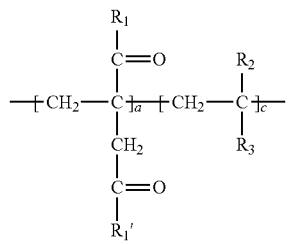

wherein $R_1$ and $R_1'$ are independently selected from the group consisting of an —OH group or $O^-M^+$ where M=Na, K, Li or a primary, secondary or tertiary amine; $R_2$ is selected from the group consisting of a hydrogen atom, a methyl or ethyl group; $R_3$ is selected from the group consisting of a hydrogen atom, methyl group, ethyl group, aromatic group, acetate group, alcohol group, carboxylic group, a carboxylate (—COO$^-$M$^+$) with M=Na, K, Li or a primary, secondary or tertiary amine providing the cationic charge, an amide group, a phosphonic acid group, an aromatic group; an alkyl acrylate, an alkyl acetate group a nitrile group, a halide group;

(b) simultaneously decarboxylating said polymer and introducing amide functionality to form:

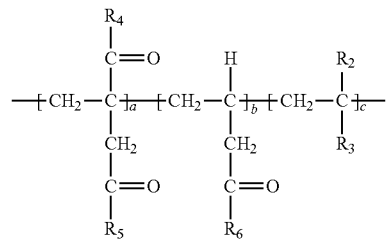

wherein repeat unit a in the above structure is present in the range of 1-99 wt. %, repeat unit b is present in the range of 1-99 wt. % and repeat unit c is present in the range of 0-50 wt. % % wherein repeat units a, b and c are present at a total 100 wt. % and wherein $R_4$, $R_5$ and $R_6$ can be independently selected from the group consisting of an —OH group or $O^-M^+$ where M=Na, K, Li or a primary, secondary or tertiary amine and at least a portion of $R_4$, $R_5$ or $R_6$ is —NHR$_7$ wherein $R_7$ in —NHR$_7$ is independently selected from the group consisting of:

(1) an alkyl chain of up to and including 20 carbon atoms, to provide for example: —(CH$_2$)$_{19}$CH$_3$, said alkyl chain optionally including a sulfonic acid group, an alcohol group, an amine group or carboxylic acid group to provide, for example: —CH$_2$CH$_2$—SO$_3$H or —CH$_2$CH$_2$OH or —CH$_2$CH$_2$NH$_2$ or —CH$_2$CH$_2$COOH;

(2) an L-cysteine derivative comprising:

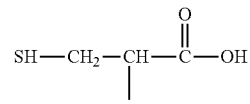

(3) an aromatic group;

(4) alkyl polyether functionality; or (5) polysiloxane functionality.

The polymer structures so formed from the simultaneous decarboxylation and introduction of amide functionality may be used to form dispersions and/or to provide aqueous systems for prevention of scaling.

DETAILED DESCRIPTION

The preferred monomers suitable for polymerization herein include the general structures below. Accordingly, a first itaconic acid monomer having the following structure:

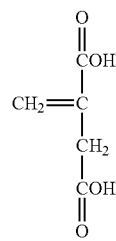

In addition, the itaconic acid may be present in partially neutralized form as the metal salt of itaconic acid as in:

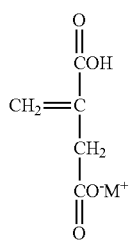

or

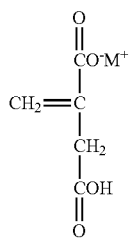

where M⁺ is reference to a metal such as Na, K, or Li or a primary, secondary or tertiary amine providing the cationic charge. For example, the above carboxylate group may be present as:

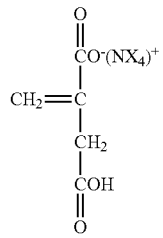

where X may be an alkyl group or an aryl group or hydrogen (e.g. —NH$_4^+$).

It has been found that to provide for relatively more efficient polymerization and in particular relatively high conversion (e.g. conversion at or greater than 75% wt of the monomer) the itaconic acid monomers identified above are preferably neutralized under selected conditions in order to optimize the ensuing polymerization which may then improve values of conversion and/or molecular weight. The molecular weights that are improved may include the number average molecular weight (Mn) and/or weight average molecular weight (Mw).

The amount of neutralization may be adjusted to provide a less than complete neutralization of the acidic groups present on the itaconic acid monomers. For example, in the case of itaconic acid, it may be understood that complete neutralization will require two moles of neutralizer for each mole of itaconic acid. That is, two moles of sodium hydroxide would provide complete neutralization of one mole of itaconic acid, and any amount of sodium hydroxide less than two moles would provide the desired result of partial neutralization. Those of skill in the art would recognize that when a divalent base is employed to neutralize itaconic acid, the amount of divalent base selected to completely neutralize itaconic acid would be 1.0 mole of divalent base for each mole of itaconic acid, and to partially neutralize, less than one mole of divalent base may be applied to partially neutralize the itaconic acid monomer.

It has been found that the level of neutralization herein may be preferentially maintained at about 25.0 mole % to 85.0 mole %, including all values therein, in 1.0 mole % increments. For example, for a 1.0 moles of itaconic acid, one may preferably neutralize 0.25 moles of the acid groups present to 0.85 moles of the acid groups present. More preferably, the level of neutralization may be maintained at a level of 40.0 mole % to 60.0 mole %, and in a most preferred embodiment, the level of neutralization of the acid monomer selected may be in the range of 45.0 mole % to 55.0 mole %.

The temperature at which partial neutralization may be achieved may also be adjusted such that neutralization is accomplished at temperatures of 50° C. to 150° C., including all values therein, in 1.0° C. increments. For example, it is preferable that the neutralization temperature is adjusted to be 50° C. to 110° C., and in a most preferred configuration, the neutralization temperature is adjusted to be in the range of 65° C. to 100° C.

A second monomer may optionally be employed herein, of the following general structure:

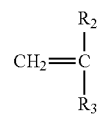

wherein $R_2$ can be either a hydrogen atom, a methyl or ethyl group and $R_3$ is either a hydrogen atom, methyl group, ethyl group, aromatic group, acetate group (e.g. —OCOCH$_3$), a carboxylic group, a carboxylate (—COO⁻M⁺) with M=Na, K, Li or a primary, secondary or tertiary amine providing the cationic charge, an amide group, a sulfonic or a phosphonic acid group. It should be noted that subsequent to polymerization, the acetate group may then be converted into an alcohol group (—OH). Accordingly the second monomer can include 2-acrylamido-2-methyl-1-propanesulfonic acid having the following structure:

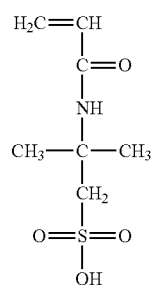

In addition, one may utilize acrylamide having the following structure:

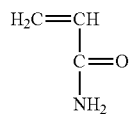

Furthermore, one may utilize a vinyl phosphonate, such as vinylphosphonic acid having the following structure:

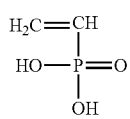

Upon polymerization and the simultaneous decarboxylation and introduction of amide functionality discussed herein, one may then form the following polymer structure:

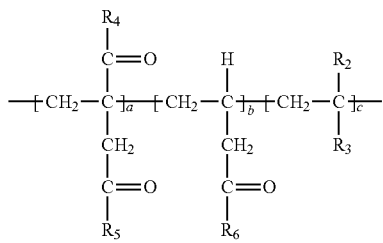

In the above repeat unit a is present in the range of 1-99 wt. %, repeat unit b is present in the range of 1-99 wt. % and repeat unit c is present in the range of 0-50 wt. % and repeat units a, b and c are present at a total of 100 wt. %, wherein $R_4$, $R_5$ or $R_6$ can individually be selected from an —OH group (to represent carboxylic acid functionality), $O^-M^+$ (to represent a carboxylate) where M=Na, K, Li or a primary, secondary or tertiary amine providing the cationic charge and at least of portion of $R_4$, $R_5$ or $R_6$ is —$NHR_7$ (which provides the amide linkage from the amidation reaction) wherein $R_7$ in —$NHR_4$ is independently selected from the group consisting of:

(1) an alkyl chain of up to and including 20 carbon atoms, to provide for example: —$(CH_2)_{19}CH_3$, said alkyl chain optionally including a sulfonic acid group, an alcohol group, amine group or carboxylic acid group to provide, for example: —$CH_2CH_2$—$SO_3H$ or —$CH_2CH_2OH$ or —$CH_2CH_2NH_2$ or —$CH_2CH_2COOH$; or (2) an L-cysteine derivative comprising:

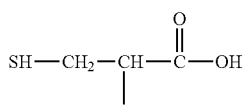

or (3) an aromatic group to provide —NHAr; or (4) alkyl polyether functionality as in polyethylene oxide —$(CH_2CH_2O)_n$—$CH_2CH_2OH$ or polypropylene oxide —$(CH_2CH(CH_3)O)_n$—$CH_2CH(CH_3)OH$ where n has a value of up to and including 50 repeat units for the indicated ethylene oxide (EO) or propylene oxide (PO) repeating unit or an ethylene oxide/propylene oxide copolymer repeating unit structure, as in —$(CH_2CH_2O)_x$—$(CH_2CH(CH_3)O)_y$—$CH_2CH(CH_3)$—OH where x and y in combination provide up to and including 50 repeating units; or (5) polysiloxane functionality as in

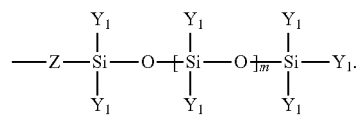

In the above, $Y_1$ may be an alkyl group such as a methyl group (—$CH_3$) or ethyl group (—$CH_2CH_3$) or phenyl group and Z is an optional linking functionality which may include an ethyl group such as —$CH_2CH_2$— or a propyl group such as —$CH_2CH_2CH_2$— and the value of m is up to and including 20.

On the issue of decarboxylation, it should therefore be noted that decarboxylation herein proceeds generally as follows, and with reference to the partially neutralized polyitaconic acid portion of the polymer structure above, it appears to occur on the carboxylic acid group attached to the main chain such that repeating unit "a" as shown below is decarboxylated to provide repeating unit "b":

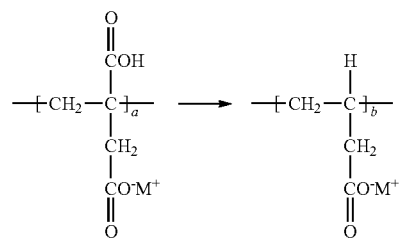

Amidation of the carboxylic acid group by treatment of the polymerized and partially neutralized polyitaconic acid by treatment with $R_7NH_2$, with $R_7$ as defined above, may be illustrated as follows:

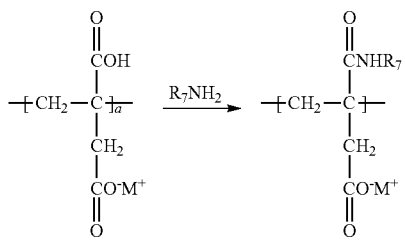

The simultaneous decarboxylation and introduction of amide functionality may now be generally written as follows:

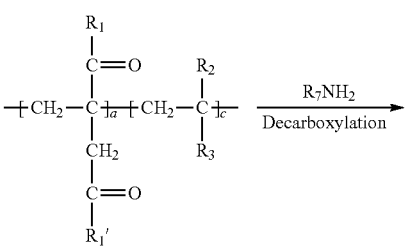

-continued

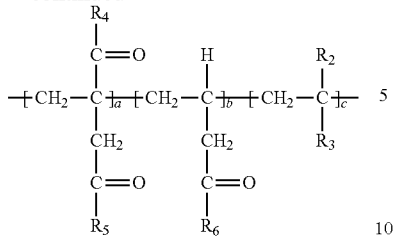

In the above, at least a portion of $R_4$, $R_5$ or $R_6$ comprises —$NHR_7$. Accordingly, the polymer so produced may have any one or more of the following structures:

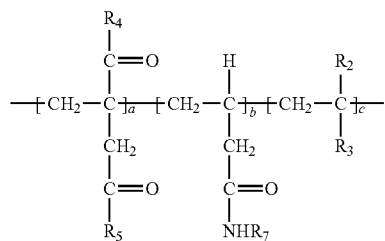

or

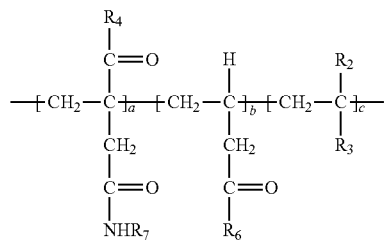

or

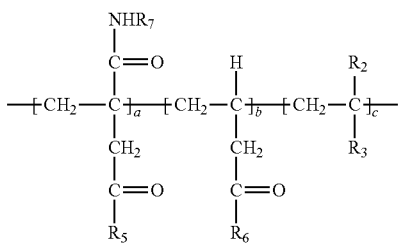

or

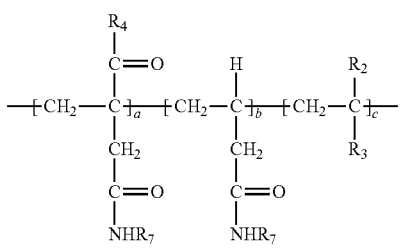

or

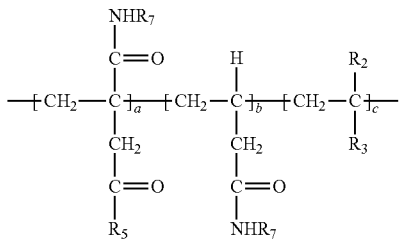

or

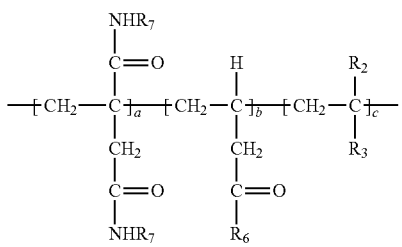

or

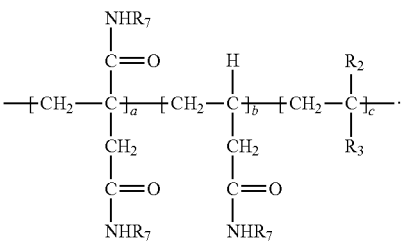

As noted above, the value of "a" in the above terpolymer structure may be from 1-99 wt. %, the value of "b" may be in the range of 1-99 wt. % (which reflects the relative amount of decarboxylation) and the value of "c" may be in the range of 0 to 50 wt. %, which then can be selected to add up to 100 wt. %. Preferably, the value of "b" may fall in the range of 5-80 wt. % or 10-75 wt. %. As noted, the presence of repeat unit "c" is optional. Preferably, when repeat unit "a" is present at a level of 5-80 wt. %, repeat unit "b" is present at a level of 5-80 wt. % and repeat unit "c" is present at a level of 0-35 wt. %. More preferably, when repeat unit "a" is present at a value of 5-30 wt. %, repeat unit "b" is present at a level of 60-80 wt. % and repeat unit "c" is present at a level of 0-25 wt. %. In addition, $R_1$, $R_2$ and $R_3$ are as defined above and as noted, in view of the introduction of amide functionality at the time of decarboxylation, at least a portion of $R_4$, $R_5$ and $R_6$ now comprises —$NHR_4$ where $R_4$ is defined above. Preferably, the polymer formed herein is such that the number average molecular weight (Mn) has a value of 500 to 10,000 or a weight average molecular weight (Mw) of 800 to 100,000. Furthermore, the decarboxylation and amidation reactions herein are such that they may preferably be conducted in the absence of any catalysis.

In addition, the polymers herein may be produced to have a desired level of tacticity with respect to analysis of triad structure by NMR techniques. For example, the polymers herein may be formed with the presence of syndiotactic triads, at a level of greater than 58.0%. For example, the level of syndiotactic triads as determined by NMR techniques, such as $C^{13}$ NMR, may be formed at the level of greater than 58.0% to 75.0%, including all values therein, in 1.0% increments.

With respect to the various polymerizations noted above, it is contemplated herein that the polymerizations may be suitable for a continuous polymerization process (i.e. a polymerization process that runs continuously and continuously provides polymeric material).

Furthermore, with respect to the feature that at least a portion of $R_4$, $R_5$ or $R_6$ comprises —$NHR_7$, which then defines amide functionality wherein —$NHR_7$ is itself connected to carbonyl functionality, the level of such amide substitution is characterized herein as a weight ratio corresponding to the amount of covalently bound —$NHR_7$ over the initial amount of unsubstituted polymer. In addition the substitution yield is determined by the weight ratio of the amount of covalently bound —$NHR_7$ over the amount of amine (i.e. $NH_2R_7$) initially added at the start of the reaction. The amide substitution level and the amide substitution yield may be determined with a gel permeation chromatograph by quantifying the amount of free amine and the amount of polymer with the following equations:

$$\text{Amide Substition Level} = \frac{\text{Weight Amount Of Free Amine Introduced}}{\text{Initial Weight of Unsubstituted Polymer}}$$

$$\text{Amide Substition Yield} = 1 - \frac{\text{Weight Amount of Free Amine Remaining}}{\text{Weight Amount of Free Amine Introduced}}$$

Accordingly, the amide substitution yield herein can fall in the range of 25% to 99%, preferably in the range of 50% to 99%, more preferably in the range of 75% to 99%, and even more preferably in the range of greater than or equal to 90% up to 99%.

EXAMPLES

Example 1

A sample of commercial poly(sodium itaconate), tradename Itaconix® DSP 2K™, with a Mn=2022 g/mole Mw=4158 g/mole, monomer to polymer conversion greater than 98 wt. %, a pH of 5.5 and a moisture content of 16.9% was used as starting polymer. 48.18 gr of this polymer was dissolved in 60 gr of water at 60° C. in a 250 ml round bottom flask with magnetic stirring and a reflux condenser. To this solution 6.59 grams of taurine was added. The solution was heated to 100° C. for 23 hours. The resulting polymer had a yellow/orange color, and remained in solution upon cooling. Resulting polymer solution had 61.3% moisture content, a pH of 7.7. Acid number determination showed 40 mole % decarboxylation. Amide substitution yield was determined to be 98%. Scale inhibition testing resulted in a transmittance at 2 ml of 76%, at 3.1 ml of 50% and at 4 ml of 38%.

Example 2

A sample of commercial poly(sodium itaconate), tradename Itaconix® DSP 2K™, with a Mn=2022 g/mole Mw=4158 g/mole, monomer to polymer conversion greater than 98 wt. %, a pH of 5.5 and a moisture content of 16.9% was used as starting polymer. 48.18 gr of this polymer was dissolved in a mixture of 60 gr of water and 10.5 g of 50 wt % sodium hydroxide solution at 60° C. in a 250 ml round bottom flask with magnetic stirring and a reflux condenser. To this solution 6.59 grams of taurine was added. The solution was heated to 100° C. for 24 hours. The resulting polymer had a yellow/orange color, and remained in solution upon cooling. Resulting polymer solution had 61.3% moisture content, a pH of 10.8. Acid number determination showed 26 mole % decarboxylation. Amide substitution yield was determined to be 97%. Scale inhibition testing resulted in a transmittance at 2 ml of 85%, at 3.1 ml of 54% and at 4 ml of 35%.

Example 3

A sample of commercial poly(sodium itaconate), tradename Itaconix® DSP 2K™, with a Mn=2022 g/mole Mw=4158 g/mole, monomer to polymer conversion greater than 98 wt. %, a pH of 5.5 and a moisture content of 16.9% was used as starting polymer. 48.20 gr of this polymer was dissolved in 60 gr of water at 60° C. in a 250 ml round bottom flask with magnetic stirring and a reflux condenser. To this solution 3.24 grams of ethanolamine was added. The solution was heated to 100° C. for 24 hours. The resulting polymer had an orange color, and remained in solution upon cooling. Resulting polymer solution had 69.5% moisture content, a pH of 8.90. Acid number determination showed 30 mole % decarboxylation. Amide substitution yield was determined to be 85%. Scale inhibition testing resulted in a transmittance at 2 ml of 79%, at 3.1 ml of 47% and at 4 ml of 26%.

Example 4

A sample of commercial poly(sodium itaconate), tradename Itaconix® DSP 2K™, with a Mn=2022 g/mole Mw=4158 g/mole, monomer to polymer conversion greater than 98 wt. %, a pH of 5.5 and a moisture content of 16.9% was used as starting polymer. 48.19 gr of this polymer was dissolved in a mixture of 62 gr of water and 10.55 gr of 50 wt % sodium hydroxide solution at 60° C. in a 250 ml round bottom flask with magnetic stirring and a reflux condenser. To this solution 3.21 grams of ethanolamine was added. The solution was heated to 100° C. for 24 hours. The resulting polymer had an orange color, and remained in solution upon cooling. Resulting polymer solution had 61.9% moisture content, a pH of 11.2. Acid number determination showed 21 mole % decarboxylation. Amide substitution yield was determined to be 88%. Scale inhibition testing resulted in a transmittance at 2 ml of 89%, at 3.1 ml of 54% and at 4 ml of 18%.

Example 5

A sample of commercial poly(sodium itaconate), tradename Itaconix® DSP 2K™, with a Mn=2022 g/mole Mw=4158 g/mole, monomer to polymer conversion greater than 98 wt. %, a pH of 5.5 and a moisture content of 16.9% was used as starting polymer. 48.20 gr of this polymer was dissolved in 60 gr of water at 60° C. in a 250 ml round bottom flask with magnetic stirring and a reflux condenser. To this solution 3.85 grams of butylamine was added. The solution was heated to 90-95° C. for 24 hours. The resulting polymer had an orange color, and remained in solution upon cooling. Resulting polymer solution had 63.3% moisture content, a pH of 9.2. Acid number determination showed 30 mole % decarboxylation. Amide substitution yield was determined to be 97%. Scale inhibition testing resulted in a transmittance at 2 ml of 82%, at 3.1 ml of 55% and at 4 ml of 27%.

Example 6

A sample of commercial poly(sodium itaconate), tradename Itaconix® DSP 2K™, with a Mn=2022 g/mole Mw=4158 g/mole, monomer to polymer conversion greater than 98 wt. %, a pH of 5.5 and a moisture content of 16.9% was used as starting polymer. 48.19 gr of this polymer was dissolved in 60 gr of water at 60° C. in a 250 ml round bottom flask with magnetic stirring and a reflux condenser. To this solution 6.39 grams of L-cysteine was added. The solution was heated to 100° C. for 24 hours. The resulting polymer had a dark red/orange color, and remained in solution upon cooling. Resulting polymer solution had 68.2% moisture content, a pH of 7.3. Acid number determination showed 28 mole % decarboxylation. Amide substitution yield was determined to be 96%. Scale inhibition testing resulted in a transmittance at 2 ml of 74%, at 3.1 ml of 39% and at 4 ml of 16%.

Example 7

A sample of commercial poly(sodium itaconate), tradename Itaconix® DSP 2K™, with a Mn=2022 g/mole Mw=4158 g/mole, monomer to polymer conversion greater than 98 wt. %, a pH of 5.5 and a moisture content of 16.9% was used as starting polymer. 48.19 gr of this polymer was dissolved in a mixture of 60 gr of water and 21.15 gr of 50 wt % sodium hydroxide solution at 60° C. in a 250 ml round bottom flask with magnetic stirring and a reflux condenser. To this solution 6.39 grams of L-cysteine was added. The solution was heated to 100° C. for 23 hours. The resulting polymer had a bright yellow color, and split into two layers upon cooling. Resulting polymer solution had 64.4% moisture content, a pH of 11.3. Acid number determination showed 0 mole % decarboxylation. Amide substitution yield was determined to be >99%. Scale inhibition testing resulted in a transmittance at 2 ml of 64%, at 3.1 ml of 36% and at 4 ml of 17%.

Example 8

A sample of commercial poly(sodium itaconate), tradename Itaconix® DSP 2K™, with a Mn=2022 g/mole Mw=4158 g/mole, monomer to polymer conversion greater than 98 wt. %, a pH of 5.5 and a moisture content of 16.9% was used as starting polymer. 48.19 gr of this polymer was dissolved in a mixture of 60 gr of water and 10.55 gr of 50 wt % sodium hydroxide solution at 60° C. in a 250 ml round bottom flask with magnetic stirring and a reflux condenser. To this solution 6.39 grams of L-cysteine was added. The solution was heated to 100° C. for 22 hours. The resulting polymer had an orange/yellow color, and split into two layers upon cooling. Resulting polymer solution had 68.2% moisture content, a pH of 10.4. Acid number determination showed 17 mole % decarboxylation. Amide substitution yield was determined to be 79%. Scale inhibition testing resulted in a transmittance at 2 ml of 83.4%, at 3.1 ml of 43% and at 4 ml of 16%.

Example 9

A sample of commercial poly(sodium itaconate), tradename Itaconix® DSP 2K™, with a Mn=2022 g/mole Mw=4158 g/mole, monomer to polymer conversion greater than 98 wt. %, a pH of 5.5 and a moisture content of 16.9% was used as starting polymer. 48.19 gr of this polymer was dissolved in a mixture of 60 gr of water and 21.05 gr of 50 wt % sodium hydroxide solution at 60° C. in a 250 ml round bottom flask with magnetic stirring and a reflux condenser. To this solution 5.27 grams of Jeffamine® M1000 was added. The solution was heated to 100° C. for 23 hours. The resulting polymer had a yellow color, and split into two layers upon cooling. Resulting polymer solution had 59% moisture content, a pH of 11.7. Acid number determination showed 12 mole % decarboxylation. Amide substitution yield was determined to be 71%. Scale inhibition testing resulted in a transmittance at 2 ml of 59%, at 3.1 ml of 31% and at 4 ml of 12%.

Example 10

A sample of commercial poly(sodium itaconate), tradename Itaconix® DSP 2K™, with a Mn=2022 g/mole Mw=4158 g/mole, monomer to polymer conversion greater than 98 wt. %, a pH of 5.5 and a moisture content of 16.9% was used as starting polymer. 48.20 gr of this polymer was dissolved in a mixture of 60 gr of water and 21.13 gr of 50 wt % sodium hydroxide solution at 60° C. in a 250 ml round bottom flask with magnetic stirring and a reflux condenser. To this solution 5.25 grams of Jeffamine® D2000 was added. The solution was heated to 100° C. for 23 hours. The resulting polymer had a yellow color, and split into two layers upon cooling. Resulting polymer solution had 60% moisture content, a pH of 11.6. Acid number determination showed 32 mole % decarboxylation. Amide substitution yield was determined to be 83%. Scale inhibition testing resulted in a transmittance at 2 ml of 58%, at 3.1 ml of 31% and at 4 ml of 13%.

Example 11

A sample of commercial poly(sodium itaconate), tradename Itaconix® DSP 2K™, with a Mn=1501 g/mole Mw=6293 g/mole, monomer to polymer conversion greater than 94 wt. %, a pH of 3.9 and a moisture content of 10.8% was used as starting polymer. 42.95 gr of this polymer was dissolved in 60 gr of water at 60° C. in a 250 ml round bottom flask with magnetic stirring and a reflux condenser. To this solution 6.63 grams of taurine was added. The solution was heated to 100° C. for 24 hours. The resulting polymer had a yellow/orange color, and remained in solution upon cooling. Resulting polymer solution had 62.8% moisture content, a pH of 4.7. Acid number determination showed 34 mole % decarboxylation. Amide substitution yield was determined to be 74%. Scale inhibition testing resulted in a transmittance at 2 ml of 91%, at 3.1 ml of 79% and at 4 ml of 67%.

Example 12

A sample of commercial poly(sodium itaconate), tradename Itaconix® DSP 1K™, with a Mn=889 g/mole Mw=1403 g/mole, monomer to polymer conversion greater than 8 wt. %, a pH of 5.1 and a moisture content of 11.5% was used as starting polymer. 51.29 gr of this polymer was dissolved in a mixture of 60 gr of water and 21.04 gr of 50 wt % sodium hydroxide solution at 60° C. in a 250 ml round bottom flask with magnetic stirring and a reflux condenser. To this solution 6.60 grams of taurine was added. The solution was heated to 100° C. for 24 hours. The resulting polymer had a yellow/orange color, and remained in solution upon cooling. Resulting polymer solution had 56.8% moisture content, a pH of 11.0. Acid number determination showed 27 mole % decarboxylation. Amide substitution yield was determined to be 65%. Scale inhibition testing resulted in a transmittance at 2 ml of 90%, at 3.1 ml of 53% and at 4 ml of 23%.

Example 13

A sample of commercial poly(sodium itaconate), tradename Itaconix® DSP 1K™, with a Mn=1323 g/mole Mw=2298 g/mole, monomer to polymer conversion greater than 98 wt. %, a pH of 5.0 and a moisture content of 17.3% was used as starting polymer. 48.20 gr of this polymer was dissolved in a mixture of 60 gr of water and 21.08 gr of 50 wt % sodium hydroxide solution at 60° C. in a 250 ml round bottom flask with magnetic stirring and a reflux condenser. To this solution 6.60 grams of taurine was added. The solution was heated to 100° C. for 24 hours. The resulting polymer had a yellow/orange color, and remained in solution upon cooling. Resulting polymer solution had 59.6% moisture content, a pH of 11.6. Acid number determination showed 24 mole % decarboxylation. Amide substitution yield was determined to be 57%. Scale inhibition testing resulted in a transmittance at 2 ml of 87%, at 3.1 ml of 43% and at 4 ml of 26%.

Example 14

A sample of commercial poly(sodium itaconate), tradename Itaconix® DSP 2K™, with a Mn=2022 g/mole Mw=4158 g/mole, monomer to polymer conversion greater than 98 wt. %, a pH of 5.5 and a moisture content of 16.9% was used as starting polymer. 48.20 gr of this polymer was dissolved in a mixture of 80 gr of water and 21.15 gr of 50 wt % sodium hydroxide solution at 60° C. in a 250 ml round bottom flask with magnetic stirring and a reflux condenser. To this solution 6.58 grams of taurine was added. The solution was heated to 100° C. for 24 hours. The resulting polymer had a yellow color, and remained in solution upon cooling. Resulting polymer solution had 64.8% moisture content, a pH of 11.4. Acid number determination showed 25 mole % decarboxylation. Amide substitution yield was determined to be 27%. Scale inhibition testing resulted in a transmittance at 2 ml of 86%, at 3.1 ml of 38% and at 4 ml of 21%.

Example 15

A sample of commercial poly(sodium itaconate), tradename Itaconix® DSP 2K™, with a Mn=2022 g/mole Mw=4158 g/mole, monomer to polymer conversion greater than 98 wt. %, a pH of 5.5 and a moisture content of 16.9% was used as starting polymer. 48.20 gr of this polymer was dissolved in a mixture of 80 gr of water and 21.15 gr of 50 wt % sodium hydroxide solution at 60° C. in a 250 ml round bottom flask with magnetic stirring and a reflux condenser. To this solution 6.58 grams of taurine was added. The solution was heated to 100° C. for 24 hours. The resulting polymer had a yellow color, and remained in solution upon cooling. Resulting polymer solution had 64.8% moisture content, a pH of 11.4. Acid number determination showed 25 mole % decarboxylation. Amide substitution yield was determined to be 27%. Scale inhibition testing resulted in a transmittance at 2 ml of 86%, at 3.1 ml of 38% and at 4 ml of 21%.

Example 16

A sample of commercial poly(sodium itaconate), tradename Itaconix® DSP 5K™, with a Mn=6817 g/mole Mw=21195 g/mole, monomer to polymer conversion greater than 98 wt. %, a pH of 5.4 and a moisture content of 16.4% was used as starting polymer. 48.20 gr of this polymer was dissolved in a mixture of 60 gr of water and 29.55 gr of 50 wt % potassium hydroxide solution at 60° C. in a 250 ml round bottom flask with magnetic stirring and a reflux condenser. To this solution 6.59 grams of taurine was added. The solution was heated to 100° C. for 24 hours. The resulting polymer had an orange/yellow color, and remained in solution upon cooling. Resulting polymer solution had 62.0% moisture content, a pH of 11.5. Acid number determination showed 16 mole % decarboxylation. Amide substitution yield was determined to be 68%. Scale inhibition testing resulted in a transmittance at 2 ml of 88%, at 3.1 ml of 49% and at 4 ml of 17%.

Example 17

A sample of commercial poly(sodium itaconate), tradename Itaconix® DSP 10K™, with a Mn=11271 g/mole Mw=59698 g/mole, monomer to polymer conversion greater than 89 wt. %, a pH of 5.1 and a moisture content of 14.0% was used as starting polymer. 48.20 gr of this polymer was dissolved in a mixture of 70 gr of water and 29.60 gr of 50 wt % potassium hydroxide solution at 60° C. in a 250 ml round bottom flask with magnetic stirring and a reflux condenser. To this solution 6.60 grams of taurine was added. The solution was heated to 100° C. for 24 hours. The resulting polymer had a dark orange color, and remained in solution upon cooling. Resulting polymer solution had 63.0% moisture content, a pH of 11.3. Acid number determination showed 15 mole % decarboxylation. Amide substitution yield was determined to be 84%. Scale inhibition testing resulted in a transmittance at 2 ml of 85%, at 3.1 ml of 45% and at 4 ml of 16%.

Example 18

A sample of commercial poly(sodium itaconate), tradename Itaconix® DSP 1K™, with a Mn=889 g/mole Mw=1404 g/mole, monomer to polymer conversion greater than 8.0 wt. %, a pH of 5.1 and a moisture content of 11.5% was used as starting polymer. 48.18 gr of this polymer was dissolved in 60 gr of water at 60° C. in a 250 ml round bottom flask with magnetic stirring and a reflux condenser. To this solution 6.60 grams of taurine was added. The solution was heated to 100° C. for 24 hours. The resulting polymer had a bright yellow color, and remained in solution upon cooling. Resulting polymer solution had 59.7% moisture content, a pH of 6.1. Acid number determination showed 35 mole % decarboxylation. Amide substitution yield was determined to be 95%. Scale inhibition testing resulted in a transmittance at 2 ml of 73%, at 3.1 ml of 43% and at 4 ml of 24%.

Example 19

A sample of commercial poly(sodium itaconate), tradename Itaconix® DSP 1K™, with a Mn=1324 g/mole Mw=2298 g/mole, monomer to polymer conversion greater than 98 wt. %, a pH of 5.0 and a moisture content of 17.3% was used as starting polymer. 48.16 gr of this polymer was dissolved in 60 gr of water at 60° C. in a 250 ml round bottom flask with magnetic stirring and a reflux condenser. To this solution 6.59 grams of taurine was added. The solution was heated to 100° C. for 24 hours. The resulting polymer had a bright yellow color, and remained in solution upon cooling. Resulting polymer solution had 62.3% moisture content, a pH of 6.5. Acid number determination showed 35 mole % decarboxylation. Amide substitution yield was determined to be 90%. Scale inhibition testing resulted in a transmittance at 2 ml of 77%, at 3.1 ml of 52% and at 4 ml of 41%.

Example 20

A sample of commercial poly(sodium itaconate), tradename Itaconix® DSP 5K™, with a Mn=6817 g/mole Mw=21195 g/mole, monomer to polymer conversion greater than 98 wt. %, a pH of 5.4 and a moisture content of 16.4% was used as starting polymer. 48.19 gr of this polymer was dissolved in 60 gr of water at 60° C. in a 250 ml round bottom flask with magnetic stirring and a reflux condenser. To this solution 6.60 grams of taurine was added. The solution was heated to 100° C. for 24 hours. The resulting polymer had a bright orange color, and remained in solution upon cooling. Resulting polymer solution had 63.5% moisture content, a pH of 6.9. Acid number determination showed 36 mole % decarboxylation. Amide substitution yield was determined to be 88%. Scale inhibition testing resulted in a transmittance at 2 ml of 80%, at 3.1 ml of 58% and at 4 ml of 47%.

Example 21

A sample of commercial poly(sodium itaconate), tradename Itaconix® DSP 10K™, with a Mn=11271 g/mole Mw=59698 g/mole, monomer to polymer conversion greater than 89 wt. %, a pH of 5.1 and a moisture content of 14.0% was used as starting polymer. 48.19 gr of this polymer was dissolved in 60 gr of water at 60° C. in a 250 ml round bottom flask with magnetic stirring and a reflux condenser. To this solution 6.60 grams of taurine was added. The solution was heated to 100° C. for 24 hours. The resulting polymer had a dark brown color, and remained in solution upon cooling. Resulting polymer solution had 63.5% moisture content, a pH of 6.9. Acid number determination showed 36 mole % decarboxylation. Amide substitution yield was determined to be 91%. Scale inhibition testing resulted in a transmittance at 2 ml of 78%, at 3.1 ml of 59% and at 4 ml of 46%.

Example 22

A sample of commercial poly(sodium itaconate), tradename Itaconix® DSP 2K™, with a Mn=2022 g/mole Mw=4158 g/mole, monomer to polymer conversion greater than 98 wt. %, a pH of 5.5 and a moisture content of 16.9% was used as starting polymer. 48.17 gr of this polymer was dissolved in a mixture of 62 gr of water and 10.49 gr of 50 wt % sodium hydroxide solution at 60° C. in a 250 ml round bottom flask with magnetic stirring and a reflux condenser. To this solution 6.59 grams of taurine was added. The solution was heated to 100° C. for 24 hours. The resulting polymer had an orange color, and remained in solution upon cooling. Resulting polymer solution had 64.3% moisture content, a pH of 10.6. Acid number determination showed 28 mole % decarboxylation. Amide substitution yield was determined to be 96%. Scale inhibition testing resulted in a transmittance at 2 ml of 65%, at 3.1 ml of 41% and at 4 ml of 19%.

Example 23

A sample of commercial poly(sodium itaconate), tradename Itaconix® DSP 2K™, with a Mn=2022 g/mole Mw=4158 g/mole, monomer to polymer conversion greater than 98 wt. %, a pH of 5.5 and a moisture content of 16.9% was used as starting polymer. 48.18 gr of this polymer was dissolved in a mixture of 60 gr of water and 14.76 gr of 50 wt % potassium hydroxide solution at 60° C. in a 250 ml round bottom flask with magnetic stirring and a reflux condenser. To this solution 6.58 grams of taurine was added. The solution was heated to 100° C. for 24 hours. The resulting polymer had an orange color, and remained in solution upon cooling. Resulting polymer solution had 61.2% moisture content, a pH of 10.5. Acid number determination showed 27 mole % decarboxylation. Amide substitution yield was determined to be 98%. Scale inhibition testing resulted in a transmittance at 2 ml of 80%, at 3.1 ml of 52% and at 4 ml of 35%.

Example 24

A sample of commercial poly(sodium itaconate), tradename Itaconix® DSP 2K™, with a Mn=2022 g/mole Mw=4158 g/mole, monomer to polymer conversion greater than 98 wt. %, a pH of 5.5 and a moisture content of 16.9% was used as starting polymer. 48.19 gr of this polymer was dissolved in a mixture of 60 gr of water and 21.05 gr of 50 wt % sodium hydroxide solution at 60° C. in a 250 ml round bottom flask with magnetic stirring and a reflux condenser. To this solution 26.37 grams of taurine was added. The solution was heated to 100° C. for 24 hours. The resulting polymer had a light orange color, and remained in solution upon cooling. Resulting polymer solution had 55.6% moisture content, a pH of 10.5. Acid number determination showed 4 mole % decarboxylation. Amide substitution yield was determined to be 49.8%. Scale inhibition testing resulted in a transmittance at 2 ml of 79%, at 3.1 ml of 53% and at 4 ml of 42%.

Example 25

A sample of commercial poly(sodium itaconate), tradename Itaconix® DSP 2K™, with a Mn=2022 g/mole Mw=4158 g/mole, monomer to polymer conversion greater than 98 wt. %, a pH of 5.5 and a moisture content of 16.9% was used as starting polymer. 48.18 gr of this polymer was dissolved in 60 gr of water at 60° C. in a 250 ml round bottom flask with magnetic stirring and a reflux condenser. To this solution 26.35 grams of taurine was added. The solution was heated to 100° C. for 24 hours. The resulting polymer had a light orange color, and remained in solution upon cooling. Resulting polymer solution had 55.6% moisture content, a pH of 7.3. Acid number determination showed 7 mole % decarboxylation. Amide substitution yield was determined to be 65%. Scale inhibition testing resulted in a transmittance at 2 ml of 75%, at 3.1 ml of 53% and at 4 ml of 44%.

Example 26

A sample of commercial poly(sodium itaconate), tradename Itaconix® DSP 2K™, with a Mn=2022 g/mole Mw=4158 g/mole, monomer to polymer conversion greater than 98 wt. %, a pH of 5.5 and a moisture content of 16.9% was used as starting polymer. 48.20 gr of this polymer was dissolved in 60 gr of water at 60° C. in a 250 ml round bottom flask with magnetic stirring and a reflux condenser. To this solution 13.19 grams of taurine was added. The solution was heated to 100° C. for 24 hours. The resulting polymer had an orange color, and remained in solution upon cooling. Resulting polymer solution had 59.8% moisture content, a pH of 7.9. Acid number determination showed 32 mole % decarboxylation. Amide substitution yield was determined to be 75%. Scale inhibition testing resulted in a transmittance at 2 ml of 80%, at 3.1 ml of 60% and at 4 ml of 53%.

Example 27

A sample of commercial poly(sodium itaconate), tradename Itaconix® DSP 2K™, with a Mn=2022 g/mole Mw=4158 g/mole, monomer to polymer conversion greater than 98 wt. %, a pH of 5.5 and a moisture content of 16.9% was used as starting polymer. 48.19 gr of this polymer was dissolved in 60 gr of water at 60° C. in a 250 ml round bottom flask with magnetic stirring and a reflux condenser. To this solution 19.77 grams of taurine was added. The solution was heated to 100° C. for 24 hours. The resulting polymer had an orange color, and remained in solution upon cooling. Resulting polymer solution had 57.1% moisture content, a pH of 7.5. Acid number determination showed 28 mole % decarboxylation. Amide substitution yield was determined to be 44%. Scale inhibition testing resulted in a transmittance at 2 ml of 78%, at 3.1 ml of 56% and at 4 ml of 47%.

Example 28

A sample of commercial poly(sodium itaconate), tradename Itaconix® XDP™ 820, with a Mn=2483 g/mole Mw=5777 g/mole, monomer to polymer conversion greater than 98 wt. %, a pH of 6.1 and a moisture content of 60.5% was used as starting polymer. 94.81 gr of this polymer solution was warmed to 60° C. in a 250 ml round bottom flask with magnetic stirring and a reflux condenser. To this solution 8.58 grams of taurine was added. The solution was heated to 100° C. for 24 hours. The resulting polymer had an orange/brown color, and remained in solution upon cooling. Resulting polymer solution had 53.4% moisture content, a pH of 7.5. Acid number determination showed 57 mole % decarboxylation. Amide substitution yield was determined to be 67%. Scale inhibition testing resulted in a transmittance at 2 ml of 80%, at 3.1 ml of 55% and at 4 ml of 46%.

Determination of Decarboxylation Levels

A 10 gr of a polymer solution at 15 wt. % solid content is prepared by diluting the polymer solution with reverse osmosis (RO) water. Accurate moisture content of this solution is recorded using a moisture analyzer scale. In a plastic beaker with a lid mix 5.0 g of the 15 wt. % polymer solution previously made, one adds 7.5 g of 1N HCl, and 50.0 g RO water. A mixing bar is placed in the beaker and the sample is placed on a stir plate. A pH probe is calibrated with standards at pH=1.00 and pH=13.00. A 20 mL syringe is filled with 1M NaOH and placed on an automatic syringe pump just over the mixing solution on the stir plate. A data logger is used to record pH as a function of time with a recording every second for 1500 seconds. Data recording and sodium hydroxide addition at the rate of 50 ml/hr through the automatic syringe pump are started at the same time. When the pH reaches about 12 the pump is stopped as well as the data collection. The decarboxylation is reported as one (1) minus the number of acid functions identified at pH greater than 7, divided by the total number of acid function in the starting polymer sample (assuming 2 acids per repeating unit of itaconic acid), and expressed as a %.

Given that polyitaconic acid have two carboxylic acid groups per repeat unit, the amount of decarboxylation may therefore theoretically be 200 mole % (i.e. 200 mole % carbon dioxide may be evolved per molar equivalent of itaconic acid in the polymer). In the present disclosure the level of decarboxylation is preferably above 30 mole % in the range of 40 mole % to 150 mole % of carbon dioxide evolved per molar equivalent of itaconic acid in the polymer.

Determination of pH for all Examples

All pHs are reported in solutions at 10 wt % in RO water at room temperature. The pH probe is a Tris-Compatible flat sensor. The pH meter is calibrated using pH4 and pH=7 standard solutions prior to any measurement reading.

Molecular Weight Determination

Gel Permeation Chromatography (GPC) was used to determine molecular weights and amide substitution yields. The GPC is first equilibrated with the eluent (1.67% sodium nitrate in HPLC-grade water) through three TOSOH Bioscience 08026 GPC columns for approximately one hour. A refractive index detector (RID) is used to measure signal concentration. The RID is purged for 20 minutes before sample analysis is started. The following instrument conditions are used: Eluent: 1.67 wt % sodium nitrate in HPLC-grade water with inline degas ser; Flow Rate: 1.0 mL/min; Run Time: 45 min; Injection volume: 100.mu.L Draw/Eject Speed: 200.mu.L/min; RID Optics Temperature: 40.degree. C.; Automatic Purge: 1 min; Column Temperature: 35.degree. C.

A 1 wt. % polymer solution is prepared using the GPC eluent solution as solvent. This solution is filtered with a 0.2.mu.M syringe-tip filter into a 2 mL HPLC vial which is then crimped closed. The vial is placed into the GPC autosampler and the chromatographic run is initiated. Molecular weight calibration was done using 6 polyacrylic acid standards with molecular weights ranging from 1000 g/mole to 1,360,000 g/mole, and with itaconic acid (monomer molecular weights 130). The 7 standards are used to create a 3rd order polynomial correlation between peak elution time and molecular weights. Each unknown sample is evaluated using this calibration function.

Conversion was calculated by the relative area of the residual monomer peak (with the longest elution time) over the total (polymer+monomer) area. Conversion is expressed as a weight percent.

Scale Inhibition Measurement

Scale inihibition and dispersant properties are determined by a calcium titration method while measuring turbidity with a transmittance probe. 0.06 grams of sodium carbonate, 0.04 grams of polymer sample (dry basis), and 99.9 grams of RO water were mixed together. 14 grams of the previous solution was titrated with a calcium chloride solution at an active concentration of 2 wt % at 10 ml per hour over 10 minutes of time at room temperature. The transmittance at 2 ml, 3.1 ml and at 4 ml is noted to reflect the dispersion efficacy of the polymer.

This titration method generates in increasing amount of calcium carbonate that can be effectively dispersed or inhibited from its formation by the polymeric dispersant/scale inhibitor. A relatively high transmittance value of the solution at 2 ml and 3.1 ml reflect a relatively high scale inhibition, while a relatively high transmittance at 4 ml reflects the dispersing capability of the polymer samples.

The scale inhibition that may be achieved with the partially decarboxylated and amide functionalized polymers herein is optimized where the level of polymer in solution subject to scaling may be in the range of 1-50 ppm. In addition, for preferred anti-scaling performance, the level of decarboxylation is preferably in the range of 40 mole % to 150 mole % of carbon dioxide per molar equivalent of itaconic acid and at a number average molecular weight preferably in the range of 500 to 4000 g/mole.

Accordingly, the partially decaboxylated and amide functionalized polymers herein are remarkably suitable for prevention of scaling (ability to prevent unwanted material from collection on a solid surface). Accordingly disclosed herein is a method of adding to a given aqueous system an amount of the partially neutralized and partially decarboxylated polymers herein which is sufficient to complex polyvalent metal ions in the aqueous system and prevent deposit formation in aqueous media. The polyvalent metal ions may therefore include $Ca^{+2}$, $Ba^{+2}$, $Cr^{+2}$, $Cr^{+3}$, $Cu^{+2}$, $Fe^{+2}$, $Fe^{+3}$, $Pb^{+2}$, $Mg^{+2}$, $Mn^{+2}$, $Mn^{+3}$, $Hg^{+2}$, $Sn^{+2}$, $Sn^{+4}$, $Sr^{+2}$, $Zn^{+3}$. Preferably the complexation herein is directed at complex polyvalent ions of $Ca^{+2}$, $Mg^{+2}$ and $Ba^{+2}$ and $Sr^{+2}$. Such metals may therefore be present as e.g., metal carbonates ($CO_3^{2-}$), metal sulfates ($SO_4^{2-}$), metal sulfites ($SO_3^{2-}$), or metal thiosulfites ($S_2O_3^{2-}$).

Applications of the above for the prevention of scaling may therefore apply to and include, but not be limited to, pipes, boilers, oil and gas exploration (downhole drilling systems), water cooling systems, water purification systems (e.g., reverse osmosis systems), distillation systems, dishwasher systems and laundry systems.

Dispersion Properties

The partially decarboxylated and amide functionalized polymers herein also provide a material with, amongst other features, enhanced dispersion properties of inorganic minerals in solution. Inorganic minerals may be understood as including: (1) inorganic carbonates (e.g. inorganic compounds containing the anionic carbonate group $[CO_3]^{2-}$ such as $CaCO_3$ or $MgCO_3$); (2) inorganic oxides including simple oxides, hydroxides and multiple oxides (e.g., $TiO_2$, $Al_2O_3$, $Fe_2O_3$); (3) inorganic sulfates (e.g. inorganic compounds containing the sulfate anion $SO_4^{2-}$ an example of which is $CaSO_4$); (4) inorganic phosphates (e.g. inorganic compounds containing the anion $PO_4^{3-}$ such as $Ca_5(PO_4)_3(OH)$; and (5) silicates (inorganic compounds that contain the $[SiO4]^{4-}$ anion).

In particular, it can be noted that amidation herein via the use of taurine ($H_2N$—$CH_2CH_2$—$SO_3H$) one incorporates a $NH$—$R_4$ functionality, i.e. —$NH$—$CH_2CH_2$—$SO_3H$, which thereby incorporates a sulfonic acid into the polymer, which then provide a polymer with improved solubility in hard water (water with equivalent calcium carbonate greater or equal to 100 parts per million). In addition, the polymers herein can enhance the compatibility of ingredients in inks, carbon dispersions or iron oxide dispersions.

Moisture Content

A moisture scale analyzer was employed. It records weight as function of time, while maintaining the sample at 110° C. using an infrared heater. When a constant weight is recorded for 30 seconds, the test is completed and the weight recorded as a percent decrease from the initial weight. All moisture contents are expressed as weight percent.

The invention claimed is:
1. A method of simultaneously decarboxylating and introducing amide functionality to a polymer comprising:
(a) supplying the following polymer wherein repeating unit c is optional:

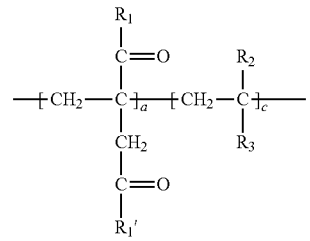

wherein $R_1$ and $R_1'$ are independently selected from the group consisting of an —OH group or $O^-M^+$ where M=Na, K, Li or a primary, secondary or tertiary amine;
$R_2$ is selected from the group consisting of a hydrogen atom, a methyl or ethyl group;
$R_3$ is selected from the group consisting of a hydrogen atom, methyl group, ethyl group, aromatic group, acetate group, alcohol group, carboxylic group, a carboxylate (—$COO^-M^+$) with M=Na, K, Li or a primary, secondary or tertiary amine providing the cationic charge, an amide group, a sulfonic or a phosphonic acid group, an aromatic group; an alkyl acrylate, an alkyl acetate group, a nitrile group, a halide group;
(b) simultaneously decarboxylating said polymer and introducing amide functionality to form:

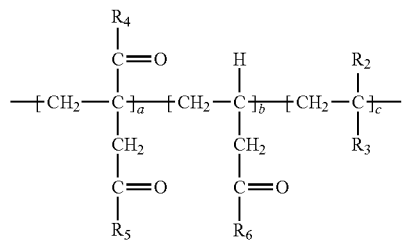

wherein repeat unit a in the above structure is present in the range of 1-99 wt. %, repeat unit b is present in the range of 1-99 wt. % and repeat unit c is present in the range of 0-50 wt. % wherein repeat units a, b and c are present at a total 100 wt. %;
wherein $R_4$, $R_5$ and $R_6$ are independently selected from the group consisting of an —OH group or $O^-M^+$ where M=Na, K, Li or a primary, secondary or tertiary amine and at least a portion of $R_4$, $R_5$ and $R_6$ is —$NHR_7$ wherein $R_7$ in —$NHR_7$ is independently selected from the group consisting of:

(1) an alkyl chain of up to and including 20 carbon atoms optionally including a sulfonic acid group, an alcohol group, amine group or carboxylic acid group;

(2) an L-cysteine derivative comprising:

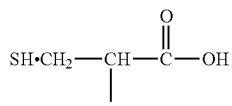

or (3) an aromatic group;
(4) alkyl polyether functionality; or
(5) polysiloxane functionality.

2. The method of claim 1 wherein said polymer formed in step (b) has a number average molecular weight of 500 to 10,000.

3. The method of claim 1 wherein said polymer formed in step (b) has a weight average molecular weight of 800 to 100,000.

4. The method of claim 1 wherein said polymer formed in step (b) has the following structure:

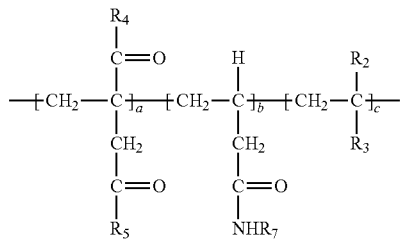

5. The method of claim 1 wherein said polymer formed in step (b) has the following structure:

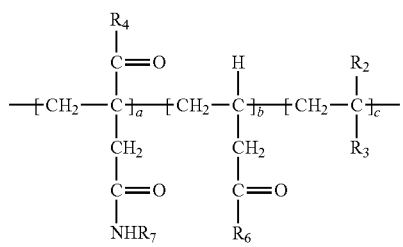

6. The method of claim 1 wherein said polymer formed in step (b) has the following structure:

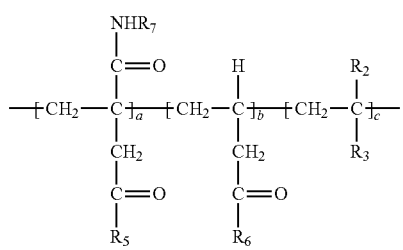

7. The method of claim 1 wherein said polymer formed in step (b) has the following structure:

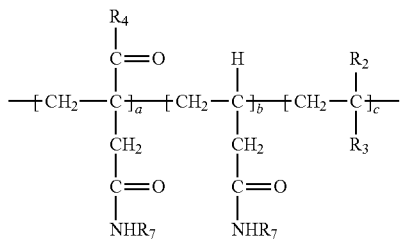

8. The method of claim 1 wherein said polymer formed in step (b) has the following structure:

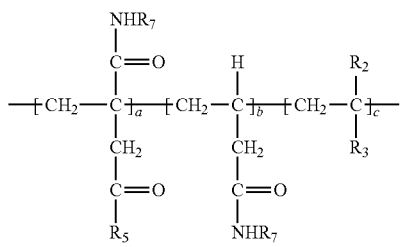

9. The method of claim 1 wherein the polymer formed in step (b) has the following structure:

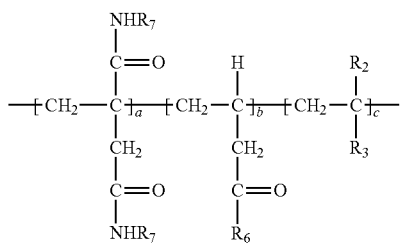

10. The method of claim 1 wherein the polymer formed in step (b) has the following structure:

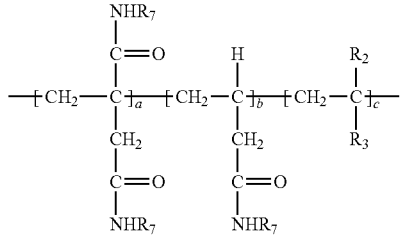

11. The method of claim 1 wherein repeat unit repeat unit a is present at a level of 5-80 wt. %, repeat unit b is present at a level of 5-80 wt. % and repeat unit c is present at a level of 0-35 wt. %.

12. The method of claim 1 wherein repeat unit a is present at a value of 5-30 wt. %, repeat unit b is present at a level of 60-80 wt. % and repeat unit c is present at a level of 0-25 wt. %.

* * * * *